United States Patent [19]

Robson et al.

[11] Patent Number: 4,632,437
[45] Date of Patent: Dec. 30, 1986

[54] PIPE COUPLING

[76] Inventors: Anthony R. Robson, Windy Ridge, Trundle Lane, Fishlake, near Doncaster; George M. Marsden, Robin Hill, Manor Drive, Cadeby, Doncaster DN5 7SP, both of England

[21] Appl. No.: 789,745

[22] Filed: Oct. 21, 1985

[30] Foreign Application Priority Data

Apr. 3, 1985 [GB] United Kingdom ............... 8508757

[51] Int. Cl.[4] .................................... F16L 37/00
[52] U.S. Cl. .................................... 285/310; 285/314; 285/322; 285/243; 285/309; 403/350
[58] Field of Search ............... 285/310, 242, 243, 308, 285/309, 310, 314, 322, 323, DIG. 22; 403/300, 305, 315, 351, 352, DIG. 8

[56] References Cited

U.S. PATENT DOCUMENTS

| 1,966,718 | 7/1934 | Hanson ............................... 285/314 |
| 2,267,252 | 12/1941 | Pitsch ............................... 285/314 |
| 2,463,179 | 3/1949 | Iftiger, Sr. ........................ 285/314 |
| 2,784,011 | 3/1957 | Roberts ............................ 285/308 |
| 2,828,978 | 4/1958 | Wurzburger ....................... 285/314 |
| 3,191,972 | 6/1965 | Collar ............................... 285/314 |
| 3,428,340 | 2/1969 | Pelton .............................. 285/308 |
| 4,146,254 | 3/1979 | Turner et al. . |
| 4,412,694 | 11/1983 | Rosenberg ......................... 285/314 |

FOREIGN PATENT DOCUMENTS 403870 1/1934 United Kingdom .
2021722 12/1979 United Kingdom ............... 285/314

Primary Examiner—Cornelius J. Husar
Assistant Examiner—Douglas W. Hanson
Attorney, Agent, or Firm—Trexler, Bushnell & Wolters, Ltd.

[57] ABSTRACT

A pipe coupling, suitable for manufacture entirely of plastics material, for any diameter of pipe and internal pressure, has a gripping ring housed in a socket with projections extending through apertures in the socket and terminating in camming portions, which cooperate with camming portions inside a sleeve rotatable on the socket to cause the gripping ring to be urged inwards into gripping contact with a pipe inserted into the socket, which also houses a sealing ring for effecting sealing between the inserted pipe and the socket.

12 Claims, 10 Drawing Figures

PIPE COUPLING

BACKGROUND TO THE INVENTION

This invention relates to pipe couplings, more particularly—but not exclusively—for plastics pipes, being of the type having a socket with an inner internal portion for location of an inserted pipe, and an outer internal portion of larger diameter with means for location of a sealing ring acting between the socket and the inserted pipe, and a gripping ring also located in the outer internal portion of the socket and adapted to prevent withdrawal of the inserted pipe from the socket.

It is known for the gripping ring to be a radially compressible ring, with the radial compression effected by co-operating frustoconical surfaces on the ring and inside the socket and/or inside a nut screwing on to the socket and having an inwardly directed flange for urging the gripping ring axially into the socket. The disadvantage of this is that it is not possible to know and difficult to judge how much to tighten the nut to obtain a sufficient grip on the inserted pipe without risk of damage.

It is also known for the gripping ring to be a grab ring having deflectable teeth for effecting an automatic grip on a pipe inserted through it, but in addition to the disadvantages of not knowing whether the grip is adequate, whether it will be maintained, and whether the inserted pipe has been damaged, it is necessary for the grab ring to be disposed farther in the socket than the sealing ring so that the latter can seal on a portion of the surface of the inserted pipe not scarred by the teeth of the grab ring. Furthermore, because the pipe cannot be inserted into the socket without the grip being effected automatically it is not possible to effect a trial of the coupling without then having to dismantle its constituent parts.

One object of the invention is to provide a pipe coupling of the type initially described and which obviates the disadvantages of the known type just described.

Another object is to provide a pipe coupling capable of releasing from a pipe and of being re-used without necessitating replacement of the gripping ring.

A further object is to provide a pipe coupling suitable for scaling to any size of pipe and predetermining a wide range of gripping pressures applied by hand or manually with conventional tools.

Yet another object of the invention is to provide a pipe coupling for plastics pipe and which can be made entirely of non-metallic material.

BRIEF DESCRIPTION OF THE INVENTION

According to the present invention, a pipe coupling of the type initially described has its gripping ring formed with an internal diameter not less than that of the inner socket portion and with a plurality of integral projections extending into corresponding apertures in the outer socket portion, and having camming portions projecting from the radially outer ends of the apertures, the outside of the socket being provided with an encircling member rotatable on the socket and having an internal profile with corresponding camming portions for predetermined interference with those of the gripping ring projections upon rotation of the encircling member from an initial position in which the respective camming portions are out of engagement, to apply predetermined radial pressure to the projections on the gripping ring to cause it to contract into gripping engagement with the inserted pipe.

Reverse rotation or further rotation of the encircling member carries the respective camming portions out of engagement again, to remove the radial pressure on the gripping ring, thus releasing the grip of the gripping ring on the inserted pipe, which can then be withdrawn from the coupling and replaced again or replaced by another pipe, and gripping engagement effected therewith by this same gripping ring upon rotation of the encircling member again.

The apertures in the outer socket portion may be formed as slots or as notches in its outer end, and in the latter case the encircling member is formed as a sleeve rotatable on the socket, with at one end of the sleeve an inward flange overlying the outer end of the outer socket portion and with an inner diameter not less than that of the inner socket portion, and with at the other end of the sleeve inturned tabs (if the sleeve is of metal) or an inward rib (if of plastics material) engaged in a groove in the outside of the socket, while in the former case (i.e, radial slots) the encircling member may alternatively be a ring rotatable in a groove (e.g., between ribs) round the outside of the outer socket portion.

The gripping force applied by the gripping ring to the inserted pipe can be varied to suit any internal pressure by varying the interference between the camming portions on the gripping ring projections and those inside the encircling member. The camming portions of the projections on the gripping ring and the inside of the sleeve or cap may be provided with interengaging teeth to prevent reverse rotation of the encircling member on the socket, but the inserted pipe may be released by further rotation of the encircling member to disengage the camming portions on the gripping ring projections from those inside the encircling member. Alternatively, or in addition, the encircling member and the outside of the socket may be provided with radial stop members cooperating to limit the extent of rotation to that required to bring the respective camming portions into engagement or, by reverse rotation, out of engagement.

The gripping ring may be a continuous ring of plastics material, or—conveniently—it may be a split ring of metal or (preferably) plastics material, and is preferably provided with three projections—but more could be provided. The gripping ring may be provided with internal teeth or serrations to assist in gripping a plastics pipe or (more particularly) a metal pipe.

The sealing ring may be an O-ring.

The socket may be formed on one end of a length of pipe (e.g., a plastics pipe), with the inner socket portions formed as a first enlargement from the bore of the pipe; or it may be one of a coupling sleeve the other end of which is a similar socket, with the respective inner socket portions separated by an internal annular flange; or, again, it may be one end of a branch fitting having similar sockets on its other end and its branch or branches; or it may be integral with a tap or a tank or cistern.

DESCRIPTION OF THE DRAWINGS

An embodiment of the invention, and modifications thereof, will now be described, by way of example only, with reference to the accompanying drawings, in which.

DETAILED DESCRIPTION OF THE EMBODIMENT

Figure 1:
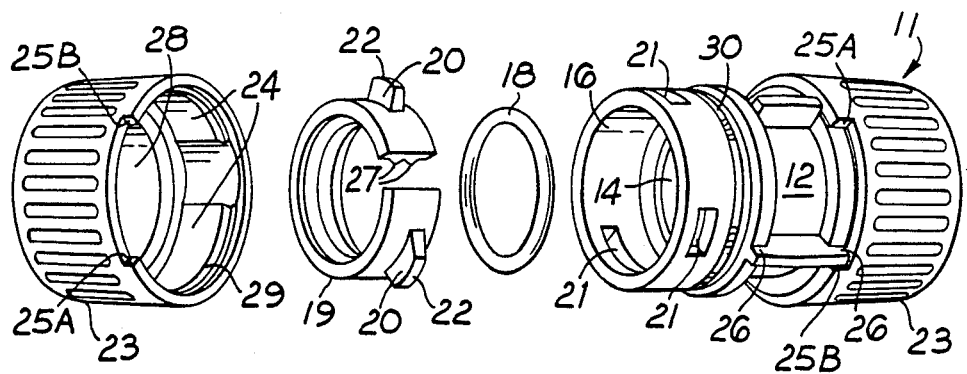
FIG. 1 is a small scale exploded perspective view showing the parts of a pipe coupling in accordance with the invention, provided at one end of a coupling sleeve the other end of which has a similar pipe coupling.
Figure 2:
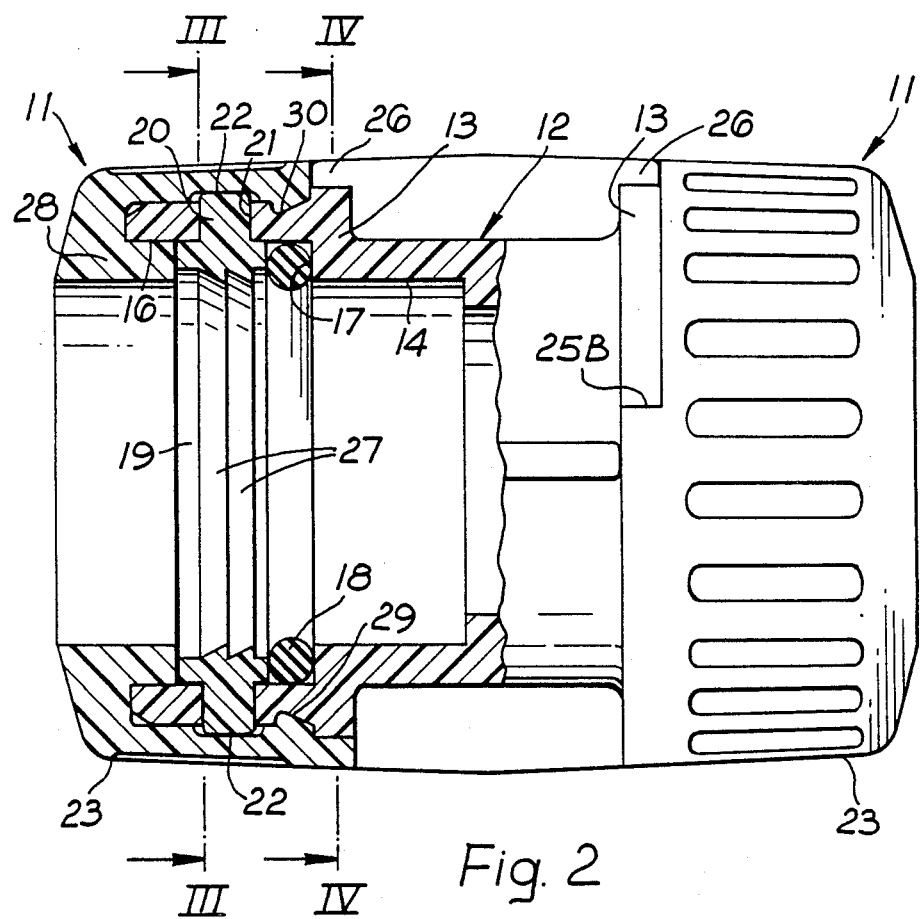
FIG. 2 is a part sectional side elevation of the coupling sleeve of FIG. 1, to a larger scale and showing the pipe coupling assembled and ready to receive a pipe.
Figure 3:
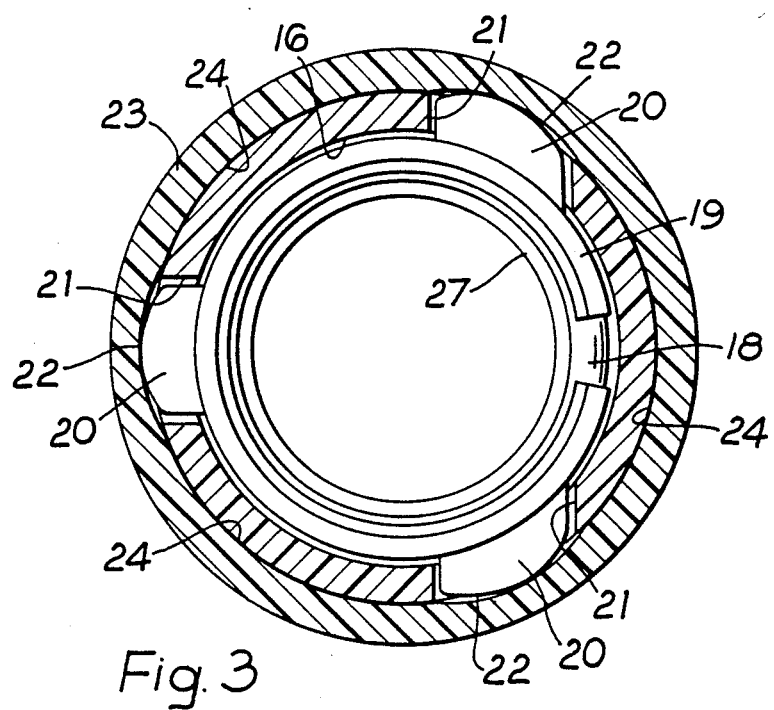
FIGS. 3 and 4 are sections on the lines III—III and IV—IV respectively of FIG. 2.
Figure 4:
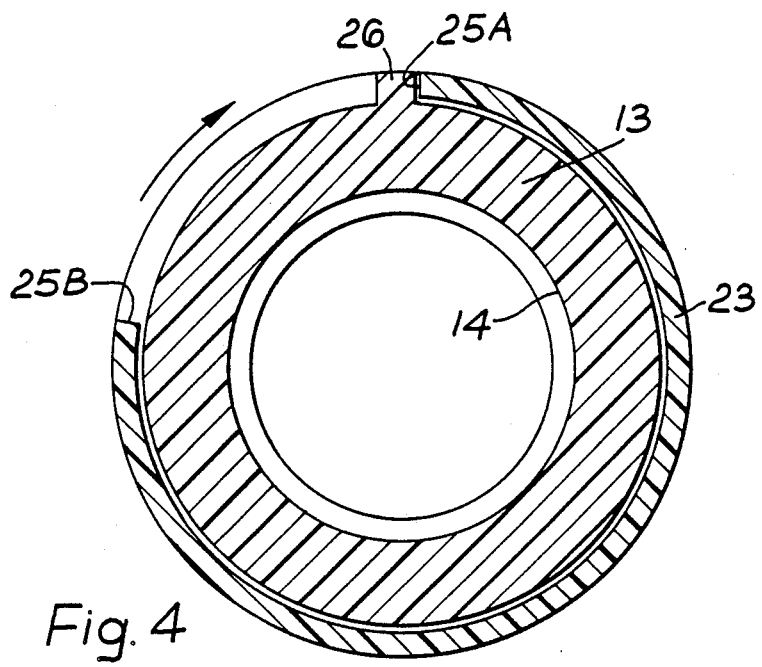
Figure 5:
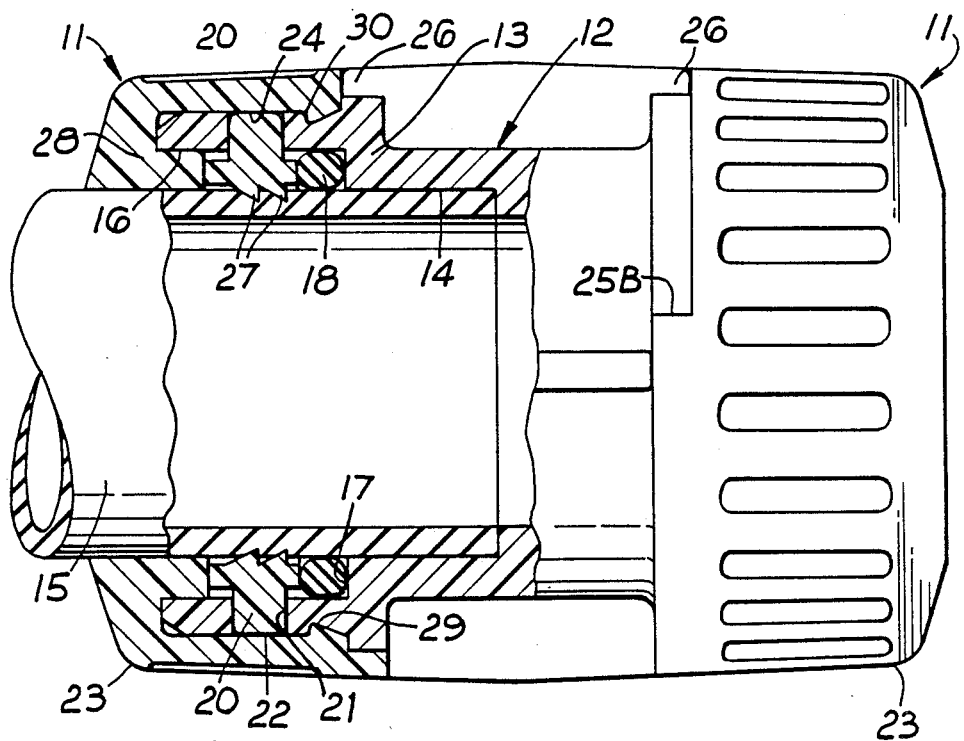
FIGS. 5 and 6 correspond to FIGS. 2 and 3 but show the coupling after insertion and gripping of a pipe.
Figure 6:
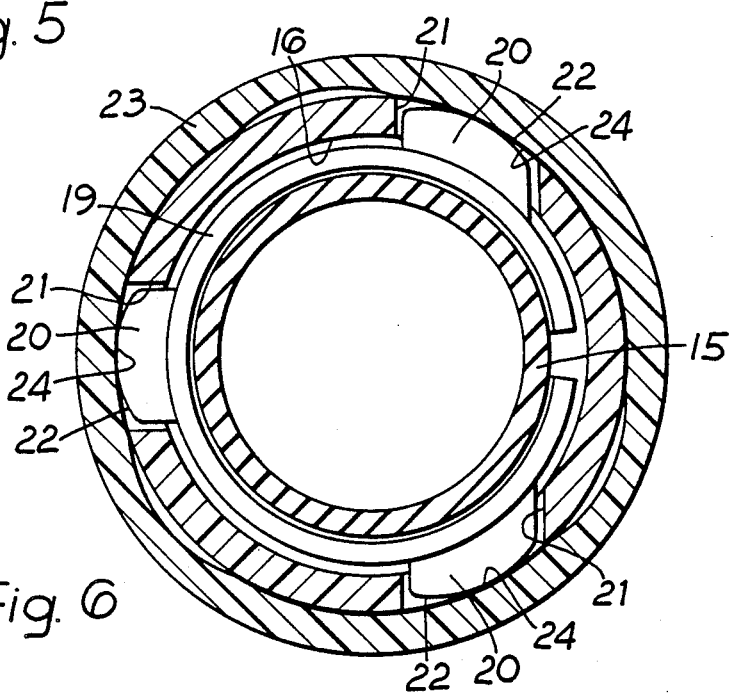

Referring to FIGS. 1 to 4, a pipe coupling 11 (on the end of a coupling sleeve 12 the other end of which has a similar pipe coupling) has a socket 13 with an inner internal portion 14 for location of an inserted pipe 15 (see FIGS. 5 and 6), and an outer internal portion 16 with means (a shoulder) 17 for location of a seaing ring (an O-ring) 18 acting between the socket and the inserted pipe, and a gripping ring 19 also located in the outer internal portion 16 of the socket and adapted (as will now be described) to prevent withdrawal of the inserted pipe from the socket.

In accordance with the invention, the gripping ring 19 is formed with an internal diameter not less than that of the inner socket portion 14 and with a plurality (three) integral projections 20 extending into corresponding apertures 21 (formed as slots) in the outer socket portions 16 and having camming portions 22 projecting from the radially outer ends of the apertures, the outside of the socket being provided with an encircling member 23 rotatable on the socket 13 and having an internal profile with corresponding camming portions 24 for predetermined interference with the camming portions 22 of the gripping ring projections 20 upon rotation of the encircling member from an intial position (FIGS. 2 and 3) in which the respective camming portions 22, 24 are out of engagement, to a subsequent position (FIGS. 5 and 6) in which the respective camming portions are in engagement, to apply predetermined radial pressure through the projections 20 on to the gripping ring 19 to cause it to contract into gripping engagement with the inserted pipe 15.

The encircling member 23 and the outside of the socket 13 are provided with radial stop members 25A, 25B and 26 cooperating to limit the extent of rotation to that required to bring the respective camming portions 22, 24 into engagement, and, by reverse rotation, out of engagement to release the grip of the gripping ring on the inserted pipe, which can then be withdrawn from the coupling 11 and replaced again or replaced by another pipe, and gripping engagement effected therewith by the same gripping member 19 upon rotation of the encircling member again.

The gripping ring 19 is a split ring of plastics material, and is provided with internal teeth 27 to assist in gripping a plastics pipe 15.

The coupling sleeve 12 is formed of plastics material, as is also encircling member 23, which is formed as a sleeve rotatable on the socket 13, with at one end of the sleeve an inward flange 28 overlying and entering the outer end of the outer socket portion 16 and with an inner diameter not less than that of the inner socket portion 14, and with at the other end of the sleeve an inward rib 29 engaged in a groove 30 in the outside of the socket.

Figure 7:
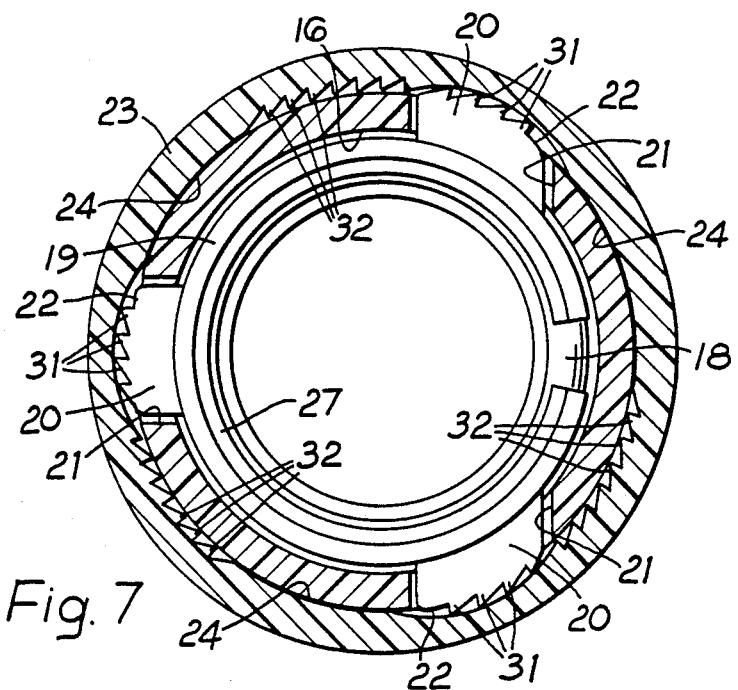
FIGS. 7 and 8 correspond to FIGS. 3 and 6, but show modifications of the camming portions for effecting gripping of the inserted pipe.
Figure 8:
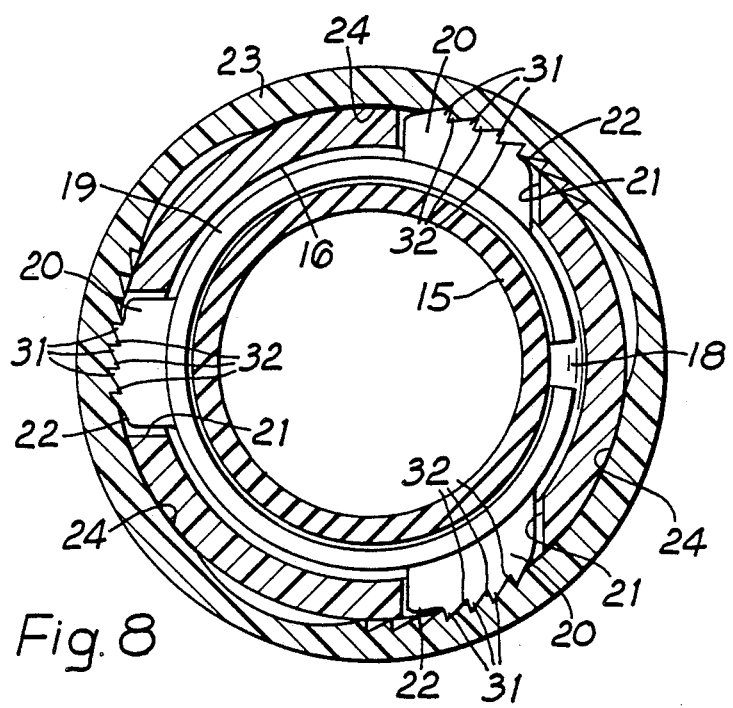

In FIGS. 7 and 8, the camming portions 22, 24 are provided with interengaging teeth 31, 32 respectively to prevent reverse rotation of the encircling member 23 on the socket 13.

Figure 9:
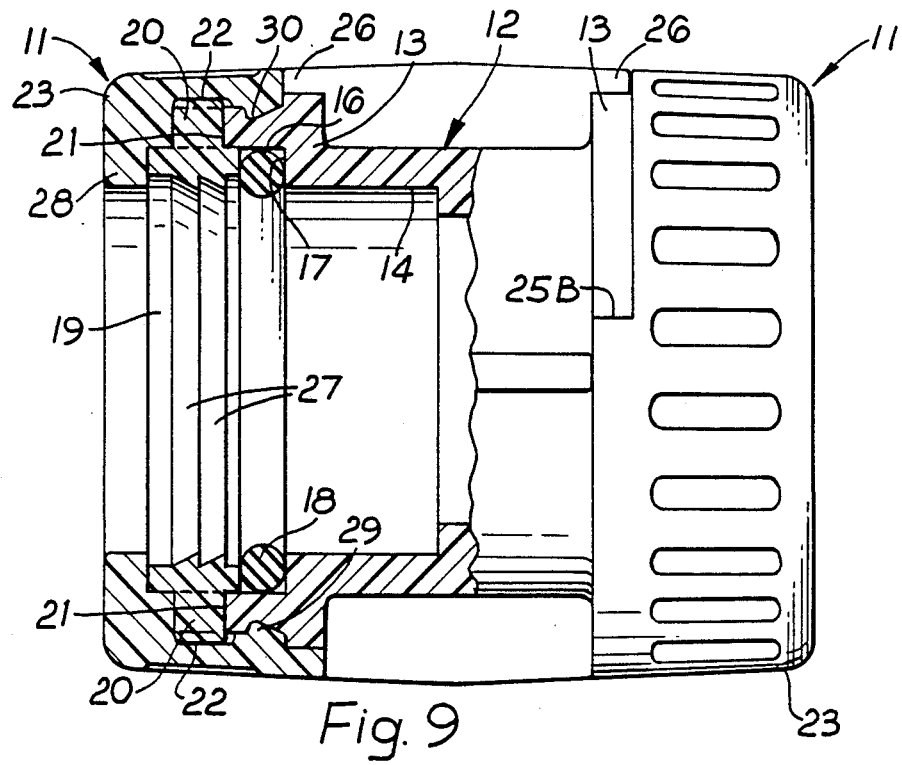
FIGS. 9 and 10 correspond to FIG. 2, but show modifications in the formation of the socket and the encircling member.

In FIG. 9 the apertures 21 are formed as notches in the outer end of the outer socket portion 16, in which notches the projections 20 on the gripping ring 19 are retained by the inward flange 28 of the encircling member 23.

Figure 10:
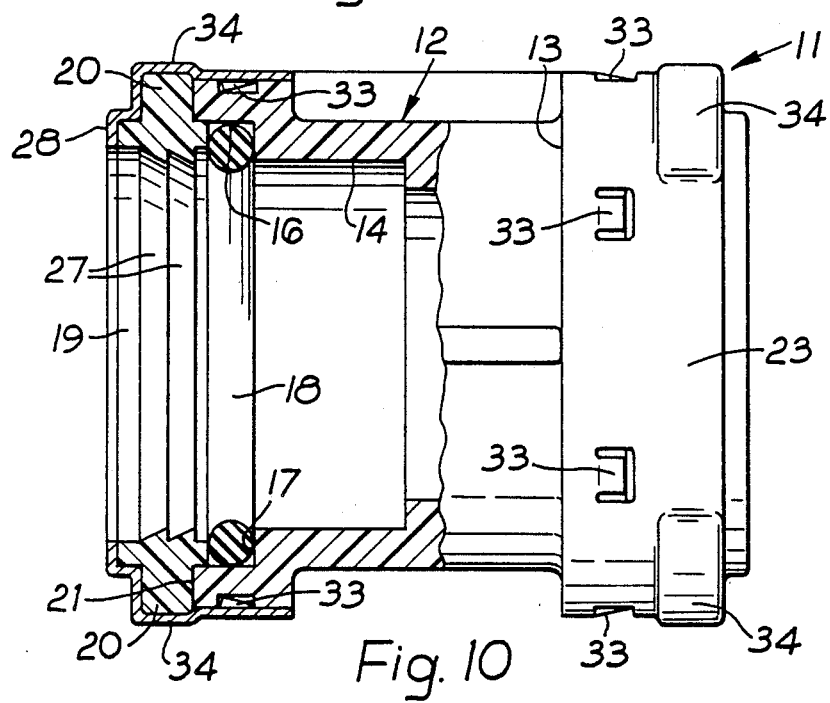

In FIG. 10 the encircling member 23 is formed of metal with an inward flange 28 at one end and with inturned tabs 33 at the other end engaging in a groove 30 in the outside of the socket 13. The encircling member is formed with bulges 34 between which lie the internal camming portions 24 (not visible).

What we claim is:

1. A pipe coupling having a socket with an inner internal portion for location of an inserted pipe, and an outer internal portion of larger diameter, and a gripping ring also located in the outer internal portion of the socket and adapted to prevent withdrawal of the inserted pipe from the socket, said gripping ring being formed with an internal diameter not less than that of the inner internal portion and with a plurality of integral projections extending into corresponding apertures in the outer internal portion, and having camming portions projecting from the radially outer ends of the projections, the outside of the socket being provided with an encircling member rotatable on the socket and having an internal profile with corresponding camming portions for predetermined interference with those of the gripping ring projections upon rotation of the encircling member from an initial position in which the respective camming portions are out of engagement, to apply predetermined radial pressure to the projections on the gripping ring to cause it to contract into gripping engagement with the inserted pipe.

2. A pipe coupling as in claim 1, wherein the apertures in the outer-socket portion are formed as slots.

3. A pipe coupling as in claim 2, wherein the encircling member is a ring rotatable in a groove round the outside of the outer socket portion.

4. A pipe coupling as in claim 1, wherein the apertures in the outer internal portion are formed as notches in its outer end, and the encircling member is formed as a sleeve rotatable on the socket, with at one end of the sleeve an inward flange overlying the outer end of the outer internal portion and with an inner diameter not less than that of the inner internal portion.

5. A pipe coupling as in claim 4, wherein the sleeve is formed of metal and the other end of the sleeve is provided with inturned tabs engaged in a groove in the outside of the socket.

6. A pipe coupling as in claim 4, wherein the sleeve is formed of plastics material and the other end of the sleeve is provided with an inward rib engaged in a groove in the outside of the socket.

7. A pipe coupling as in claim 1, wherein the camming portions of the projections on the gripping ring and the inside of the sleeve or cap are provided with interengaging teeth to prevent reverse rotation of the encircling member on the socket.

8. A pipe coupling as in claim 1, wherein the encircling member and the outside of the socket are provided with radial stop members cooperating to limit the extent of rotation to that required to bring the respective camming portions into and out of engagement.

9. A pipe coupling as in claim 1, wherein the gripping ring is a split ring.

10. A pipe coupling as in claim 9, wherein the split gripping ring is formed of plastics material.

11. A pipe coupling as in claim 1, wherein the gripping ring is provided with three projections.

12. A pipe coupling as in claim 1, wherein the gripping ring is provided with internal teeth to assist in gripping a pipe.

* * * * *